United States Patent
Den Besten

(10) Patent No.: US 6,248,041 B1
(45) Date of Patent: Jun. 19, 2001

(54) ENGINE CONTROL SYSTEM LINKED TO VEHICLES CONTROLS

(75) Inventor: John A. Den Besten, Western Springs, IL (US)

(73) Assignee: Navistar International Transportation Corp., Chicago, IL (US)

(*) Notice: Subject to any disclaimer, the term of this patent is extended or adjusted under 35 U.S.C. 154(b) by 0 days.

(21) Appl. No.: 09/352,423

(22) Filed: Jul. 13, 1999

Related U.S. Application Data
(60) Provisional application No. 60/092,905, filed on Jul. 15, 1998.

(51) Int. Cl.⁷ .............................. B60K 41/04; F02B 25/06
(52) U.S. Cl. ............................................. 477/110; 123/571
(58) Field of Search ....................... 477/107, 110, 477/111

(56) References Cited

U.S. PATENT DOCUMENTS

| | | |
|---|---|---|
| 4,493,303 | 1/1985 | Thonpson et al. . |
| 4,541,381 * | 9/1985 | Sugiura ................. 123/407 |
| 4,593,581 | 6/1986 | Omitsu . |
| 4,665,883 * | 5/1987 | Amano et al. ............. 123/571 |
| 4,745,752 * | 5/1988 | Suzuki ..................... 60/602 |
| 4,823,645 | 4/1989 | Gaus et al. . |
| 5,003,482 | 3/1991 | Teratani et al. . |
| 5,143,031 * | 9/1992 | Bruestle ................ 123/90.16 |
| 5,257,193 | 10/1993 | Kusaka et al. . |
| 5,305,662 | 4/1994 | Togai et al. . |
| 5,369,581 | 11/1994 | Ohsuga et al. . |
| 5,417,625 * | 5/1995 | Yamaki et al. ........... 477/110 X |
| 5,476,425 * | 12/1995 | Shiraishi et al. ......... 477/110 X |
| 5,484,351 | 1/1996 | Zhang et al. . |
| 5,496,227 | 3/1996 | Minowa et al. . |
| 5,575,737 * | 11/1996 | Weiss ....................... 477/43 |
| 5,597,371 | 1/1997 | Toukura . |
| 5,603,672 | 2/1997 | Zhang . |
| 5,628,706 | 5/1997 | Zhang . |
| 5,679,096 | 10/1997 | Stine et al. . |
| 5,720,358 | 2/1998 | Christensen et al. . |
| 5,724,813 * | 3/1998 | Fenelon et al. ............ 60/606 |
| 5,738,606 | 4/1998 | Bellinger . |
| 5,778,329 * | 7/1998 | Officer et al. .......... 477/156 X |
| 5,836,851 | 11/1998 | Ruman . |
| 5,868,214 | 2/1999 | Workman . |
| 5,937,831 * | 8/1999 | Volkmann et al. ......... 123/559.3 |
| 5,989,154 * | 11/1999 | Christensen et al. ........ 477/111 |
| 6,014,604 | 1/2000 | Kurolwa et al. . |
| 6,076,032 | 6/2000 | Kuroda et al. . |
| 6,104,976 | 8/2000 | Nakamura . |

FOREIGN PATENT DOCUMENTS

4309903A1 * 5/1994 (DE) ..................... 477/110

OTHER PUBLICATIONS

Mazda, EGR Control System, 1993 Mazda RX–7 Workshop Manual, F–124–F–125, 1991.*

* cited by examiner

*Primary Examiner*—Charles A. Marmor
*Assistant Examiner*—Roger Pang
(74) *Attorney, Agent, or Firm*—Dennis K. Sullivan; Jeffrey P. Calfa; Giberto Hernandez

(57) ABSTRACT

A linkage between an engine control (114) and vehicle controls, such as a transmission gear selector (100) and/or axle speed selector when the vehicle has a two-speed axle, providing input to the engine control that is additional to engine variable inputs (110) for tailoring engine performance characteristics to selected drive ratios of a drivetrain through which the engine drives the vehicle. The tailored characteristics include particular engine torque curves (FIGS. 1, 4, and 5) and particular engine speed regulation curves (FIGS. 1, 2, and 3). As the vehicle quickly accelerates through rated engine speed while the transmission in the lower gears, the driver's notices no feeling of abrupt shut-off. As the vehicle accelerates through the highest gears toward highway speed, the driver can feel sustained pulling effort by the engine.

15 Claims, 7 Drawing Sheets

HIGH GEAR ACCELERATION

US 6,248,041 B1

ENGINE CONTROL SYSTEM LINKED TO VEHICLES CONTROLS

REFERENCE TO RELATED APPLICATION AND PRIORITY CLAIM

This application expressly claims the benefit of earlier filing date and right of priority from the following patent application of the same title: U.S. Provisional Application Ser. No. 60/092,905 filed on Jul. 15, 1998 in the name of John A. Den Besten. The entirety of that earlier-filed, co-pending patent application is hereby expressly incorporated herein by reference.

FIELD OF THE INVENTION

This invention relates generally to automotive vehicles that are powered by internal combustion engines and particularly to internal combustion engine control systems that manage engine operating variables, such as the quantity of fuel injected and the timing of fuel injection, to cause an engine to respond as faithfully as possible to driver input, consistent with performance characteristics inherent in the engine's own design. The invention further relates to novel linkage between a driver input to a vehicle control system, such as transmission gear selector, and an engine control system, for selectively relating engine performance characteristics to a vehicle control input, such as the particular transmission gear of a manual transmission selected by a driver, or the particular transmission gear and/or torque converter lock-up clutch mode selected by an automatic transmission controller.

BACKGROUND OF THE INVENTION

An automotive vehicle typically includes an engine control system that causes the engine to perform in accordance with various driver inputs. Known engine control systems may integrate several and/or all of mechanical, hydraulic, pneumatic, electric, or electronic sub-systems, to cause an engine to perform in a controlled fashion in accordance with driver inputs, consistent with performance characteristics inherent in the engine's own design. For example, an engine control system may control an engine's operation based on throttle position and engine speed. Throttle position, or an equivalent, represents a driver input, and in the case of an electronic engine control system, may be obtained from a throttle position sensor under control of the driver. Engine speed may be obtained from an engine speed sensor, or equivalent data source.

A control system may utilize those inputs to control engine operation in two different ways. For engine speeds less than a rated engine speed, the engine may be said to operate along a torque curve that corresponds to a corresponding amount of throttle, and for engine speeds greater than the rated engine speed, it may be said to operate along a speed regulation curve that corresponds to the corresponding amount of throttle. For example, for engine speed less than the rated engine speed and 100%, i.e. full or wide open, throttle, the engine may be said to operate along a torque curve corresponding to 100% throttle, and for engine speed greater than the rated engine speed, along a speed regulation curve corresponding to 100% throttle. For throttle settings less than 100%, the engine operates along torque curves and speed regulation curves that are correspondingly attenuated from those corresponding to 100% throttle.

An engine torque curve follows a characteristic pattern. In the low engine speed range, engine torque is low because of the engine's inability to charge and trap the larger air volumes that it does at higher speeds. Within an intermediate engine speed range, a torque curve peaks before the engine reaches rated speed, declining from its peak as engine speed increasingly approaches rated speed. Such a decline however may be considered beneficial to overall vehicle performance when viewed from the perspective of engine speed decreasing from rated engine speed toward peak torque speed because as engine speed decreases from rated speed toward peak torque speed, the torque increases. The amount of torque increase that occurs as engine speed falls from rated speed to maximum torque speed is sometimes called torque rise.

An engine speed regulation curve possesses its own particular pattern. With an engine operating under load at rated engine speed, a progressive reduction of the engine load to a zero load condition will cause engine speed to increase to a maximum zero-load speed that is approximately 10% to 15% above rated speed. Along an initial portion of a speed curve extending from rated engine speed, the rate at which engine speed increases as engine load decreases is relatively more gradual than along a final portion of that speed curve range that leads to maximum speed that is attained at zero load. In other words, as an engine that is initially running under load at rated engine speed is increasingly unloaded, its speed at first curtails relatively more gradually and then relatively less gradually, i.e. more abruptly, as maximum engine speed is approached.

It is believed that this characteristic form of engine speed regulation typifies that of engines in known vehicles and that it does not change as the drive ratio between the engine and the driven wheels changes, such as when a multi-gear transmission is shifted through a succession of different gears. Although it is known for a controller to change engine power settings when different transmission gears are selected, the inventor is unaware that such changes also change an engine's characteristic torque curves and engine speed regulation curves, as such curves have just been described above.

Continuing evolution of engine controls, particularly electronic microprocessor controls, allows the management of many more engine variables than simply those involving the quantity and timing of fuel injection. Such controls can, for example, also manage: the overall pressure of fuel injection; the pressure pattern during an injection event; a turbocharger for the engine; and the operation of emission control devices, such as an exhaust gas recirculation valve. While it may be known to program an engine controller with a complex of control choices for best meeting the often conflicting needs of engine performance, fuel economy, noise, and exhaust emissions, it is believed that the extent to which vehicle controls should be allowed to interact with an engine controller for improving one or more aspects of vehicle performance, including the feel of a vehicle to a driver, has not been fully appreciated by the state of the art.

A preliminary novelty search in connection with this invention developed the following U.S. Pat. Nos: 4,493,303; 4,593,581; 4,823,645; 5,257,193; 5,484,351; 5,496,227; 5,597,371; 5,603,672; 5,679,096; 5,720,358; and 5,738,606. Of these, U.S. Pat. Nos. 4,493,303; 5,257,193; 5,679,096; and 5,738,606 provide some background for appreciating the distinctive aspects of the present invention.

U.S. Pat. No. 5,257,193 relates generally to control of a transmission. Although engine performance curves are stored within a microprocessor, it does not appear that selection of a particular performance curve is made by the selection of a particular transmission gear but rather by another control that the driver uses to elect either a heavy load condition or a light load condition. Moreover, the disclosed use of this invention in a dump truck operating as a construction vehicle, and the nature of its drivetrain, said to comprise a lock-up torque converter and powershift transmission, suggest that the vehicle is other than a medium or heavy truck that operates along highways at highway speeds, perhaps instead being an off-road vehicle used in mining or major earthwork operations.

U.S. Pat. No. 4,493,303 relates to an electronic control then selects from a stored set of maximum power parameters in accordance with a sensed gear position of a transmission. While the present invention also utilizes transmission gear selection as an input to an engine controller, the detailed description of the present invention that presented in this disclosure will show that its principles are novel and uniquely distinctive.

U.S. Pat. No. 5,679,096 relates to a control for limiting engine torque in accordance with gear selection.

U.S. Pat. No. 5,738,606 relates to control of engine fueling in accordance with gear selection and/or in conjunction with driveline components of limited torque-carrying capacity. It appears that a selected performance limit is bounded within an engine performance map by a singular, fixed torque curve and speed regulation curve.

SUMMARY OF THE INVENTION

The present invention relates to linkage between an engine control and vehicle controls, such as a transmission gear selector and/or axle speed selector when the vehicle has a two-speed axle, providing input to the engine control that is additional to engine variable inputs for tailoring engine performance characteristics to selected drive ratios of a drivetrain through which the engine drives the vehicle. The tailored characteristics include different engine torque curves and different engine speed regulation curves. In addition, vehicle operating mode information can be used to manage functions such as fuel injection pressure, fuel pressure pattern during an injection event, a turbocharger for the engine, and an exhaust gas recirculation valve toward the objective of optimizing performance for a particular operating mode, consistent with a fuel economy, noise, and engine exhaust emission considerations.

It is an objective of the present invention to facilitate selection of unique engine speed regulation characteristics in low gear ranges. This unique engine speed regulation can be exercised over a broader speed range than currently typical, and can also be shaped to provide a relatively uniform rate of decay in acceleration as load on an engine decreases. A purpose of this unique engine speed regulation is to substantially reduce the feeling of abrupt shut-off sensed by a driver as a vehicle quickly accelerates through rated engine speed while the transmission in the lower gears. While this feature can impart a better sense of control to the driver during low gear acceleration, it is believed that its use may be neither necessary, desirable, nor effective during accelerations in higher gear ranges.

It is a further objective of this invention to facilitate selection of a unique engine torque curve in the higher gear ranges. This unique torque curve can deliver essentially constant torque from peak torque speed to rated engine speed. This unique torque curve rises from low speed to a substantially flat plateau that extends to, and beyond, rated engine speed, and lacks the characteristic torque rise that was described earlier. Such a plateaued torque curve can impart a feeling of sustained pulling effort by the engine as the vehicle accelerates through the highest gears toward highway speed. The characteristic torque rise is believed unnecessary when a vehicle encounters an uphill grade in its highest gears, because the attendant reduction in vehicle speed will correspondingly reduce the aerodynamic load on the moving vehicle, making more torque available through the drivetrain as traction to the driven wheels.

A further refinement of sustained pulling effort can be gained with a different, unique engine speed regulation characteristic in the higher gears. This characteristic is one of very little reduction in torque during an initial portion (approximately 10%) of speed overrun past rated engine speed, but then followed by a sharp reduction of torque to an unloaded speed of about 12% percent speed increase beyond rated engine speed. Again, engine speed will be governed by the aerodynamic effect on vehicle dynamics rather than the engine control in these higher gears under most normal driving conditions, and therefore the relatively sharp cut-off in engine torque should not be noticeable to the driver.

A truck, such as a medium truck for example, may use its engine to operate auxiliary equipment, such as a refuse compactor or an aerial lift for example. For such an operating mode, the vehicle transmission is typically placed in neutral, and it is desirable for the engine to operate with relatively low or isochronous speed regulation. Another aspect of the present invention relates to attainment of this operating mode.

Trucks with transmissions having more than five forward gears may typically find full throttle shift points at speeds above peak torque speed. Therefore, in lower transmission gears that are used to accelerate a truck, rated engine speed could be reduced without loss of tractive effort to accelerate the vehicle. Reducing rated speed can reduce vehicle noise. Such a feature can be accommodated by the present invention.

Another purpose of the present invention is to enhance engine control strategy with intelligence from a vehicle. Low gears are generally used only to accelerate a vehicle, with a vehicle operating in those gears for only relatively short periods of time. The consequential impact on overall fuel economy and overall emissions output from operation in those lower gears is relatively minor. However, transient operation in lower gears lays a groundwork for more sustained running in higher gears. For example, rapid turbocharger acceleration in lower gears can provide needed airflow when shifting into higher gears. Use of recirculated exhaust gas may detract from turbocharger acceleration by diverting gases that would otherwise power the turbocharger; diluted engine charge air may be less able to burn fuel and add exhaust gas volume for acceleration. It is believed that use of a low gear signal to an engine controller for avoiding exhaust gas recirculation can enhance engine performance, and has potential to reduce overall emissions output by improving air delivery during vehicle operation in higher gears.

The invention relates to a method of operating an automotive vehicle comprising an internal combustion engine under the control of an engine control that receives various inputs including a throttle input, that is programmed with data defining different characteristic engine operation functions relating engine torque to engine speed, and that processes the inputs and the programmed data to select a characteristic engine function through which the throttle input acts to operate the engine, the vehicle also comprising a drivetrain that is operable to different drive ratios through which the engine powers the vehicle, such drive ratios including a low drive ratio wherein a ratio of vehicle speed to engine speed is relatively smaller, a high drive ratio wherein a ratio of vehicle speed to engine speed is relatively larger, and an intermediate drive ratio that is intermediate the low drive ratio and the high drive ratio, the method comprising: when the drivetrain is in the intermediate drive ratio, controlling the engine by causing the control to select a first characteristic engine function characterized by occurrence of peak torque at an engine speed below a rated engine speed at which the torque is less than peak torque, and a speed range that extends beyond rated engine speed to a maximum engine speed at which the engine outputs substantially zero torque; when the drivetrain is in the low drive ratio, controlling the engine by causing the control to select a second characteristic engine function characterized by occurrence of peak torque at an engine speed below the rated engine speed, and a speed range that extends to a maximum engine speed at which the engine outputs substantially zero torque and which is greater than the maximum engine speed of the first characteristic engine function; and when the drivetrain is in the high drive ratio, controlling the engine by selecting a third characteristic engine function characterized by occurrence of peak torque at an engine speed below the rated engine speed and of substantial maintenance of the peak torque over a range of increasing engine speeds that includes the rated engine speed and extends to a maximum engine speed at which the engine outputs substantially zero torque.

The invention also relates to an automotive vehicle comprising: an internal combustion engine under the control of an engine control that receives various inputs including a throttle input, that is programmed with data defining different characteristic engine operation functions relating engine torque to engine speed, and that processes the inputs and the programmed data to select a characteristic engine function through which the throttle input acts to operate the engine; a drivetrain that is operable to different drive ratios through which the engine powers the vehicle, such drive ratios including a low drive ratio wherein a ratio of vehicle speed to engine speed is relatively smaller, a high drive ratio wherein a ratio of vehicle speed to engine speed is relatively larger, and an intermediate drive ratio that is intermediate the low drive ratio and the high drive ratio; wherein, when the drivetrain is in the intermediate drive ratio, the control controls the engine in accordance with a first characteristic engine function characterized by occurrence of peak torque at an engine speed below a rated engine speed at which the torque is less than peak torque, and a speed range that extends beyond rated engine speed to a maximum engine speed at which the engine outputs substantially zero torque; when the drivetrain is in the low drive ratio, the control controls the engine in accordance with a second characteristic engine function characterized by occurrence of peak torque at an engine speed below the rated engine speed, and a speed range that extends to a maximum engine speed at which the engine outputs substantially zero torque and which is greater than the maximum engine speed of the first characteristic engine function; and when the drivetrain is in the high drive ratio, the control controls the engine in accordance with a third characteristic engine function characterized by occurrence of peak torque at an engine speed below the rated engine speed and of substantial maintenance of the peak torque over a range of increasing engine speeds that includes the rated engine speed and extends to a maximum engine speed at which the engine outputs substantially zero torque.

The invention also relates to a method of operating an automotive vehicle comprising an internal combustion engine under the control of an engine control that receives various inputs including a throttle input, that is programmed with data defining different characteristic engine operation functions relating engine torque to engine speed, and that processes the inputs and the programmed data to select a characteristic engine function through which the throttle input acts to operate the engine, the vehicle also comprising a drivetrain that is operable to different drive ratios through which the engine powers the vehicle, such drive ratios including a first drive ratio wherein a ratio of vehicle speed to engine speed is relatively smaller and a second drive ratio wherein a ratio of vehicle speed to engine speed is relatively larger, the method comprising: when the drivetrain is in the second drive ratio, controlling the engine by causing the control to select a first characteristic engine function characterized by occurrence of peak torque at an engine speed below a rated engine speed at which the torque is less than peak torque, and a speed range that extends beyond rated engine speed to a maximum engine speed at which the engine outputs substantially zero torque; and when the drivetrain is in the first drive ratio, controlling the engine by causing the control to select a second characteristic engine function characterized by occurrence of peak torque at an engine speed below the rated engine speed, and a speed range that extends to a maximum engine speed at which the engine outputs substantially zero torque and which is greater than the maximum engine speed of the first characteristic engine function.

The invention also relates to a method of operating an automotive vehicle comprising an internal combustion engine under the control of an engine control that receives various inputs including a throttle input, that is programmed with data defining different characteristic engine operation functions relating engine torque to engine speed, and that processes the inputs and the programmed data to select a characteristic engine function through which the throttle input acts to operate the engine, the vehicle also comprising a drivetrain that is operable to different drive ratios through which the engine powers the vehicle, such drive ratios including a first drive ratio wherein a ratio of vehicle speed to engine speed is relatively smaller and a second drive ratio wherein a ratio of vehicle speed to engine speed is relatively larger, the method comprising: when the drivetrain is in the first drive ratio, controlling the engine by causing the control to select a first characteristic engine function characterized by occurrence of peak torque at an engine speed below a rated engine speed at which the torque is less than peak torque, and a speed range that extends beyond rated engine speed to a maximum engine speed at which the engine outputs substantially zero torque; and when the drivetrain is in the second drive ratio, controlling the engine by selecting a second characteristic engine function characterized by occurrence of peak torque at an engine speed below the rated engine speed and of substantial maintenance of the peak torque over a range of increasing engine speeds that includes the rated engine speed and extends to a maximum engine speed at which the engine outputs substantially zero torque.

The invention also relates to an automotive vehicle comprising: an internal combustion engine under the control of an engine control that receives various inputs including a throttle input, that is programmed with data defining different characteristic engine operation functions relating engine torque to engine speed, and that processes the inputs and the programmed data to select a characteristic engine function through which the throttle input acts to operate the engine; a drivetrain that is operable to different drive ratios through which the engine powers the vehicle, such drive ratios including a first drive ratio wherein a ratio of vehicle speed to engine speed is relatively smaller and a second drive ratio wherein a ratio of vehicle speed to engine speed is relatively larger; wherein, when the drivetrain is in the second drive ratio, the control controls the engine in accordance with a first characteristic engine function characterized by occurrence of peak torque at an engine speed below a rated engine speed at which the torque is less than peak torque, and a speed range that extends beyond rated engine speed to a maximum engine speed at which the engine outputs substantially zero torque; and when the drivetrain is in the first drive ratio, the control controls the engine in accordance with a second characteristic engine function characterized by occurrence of peak torque at an engine speed below the rated engine speed, and a speed range that extends to a maximum engine speed at which the engine outputs substantially zero torque and which is greater than the maximum engine speed of the first characteristic engine function.

The invention also relates to an automotive vehicle comprising: an internal combustion engine under the control of an engine control that receives various inputs including a throttle input, that is programmed with data defining different characteristic engine operation functions relating engine torque to engine speed, and that processes the inputs and the programmed data to select a characteristic engine function through which the throttle input acts to operate the engine; a drivetrain that is operable to different drive ratios through which the engine powers the vehicle, such drive ratios including a first drive ratio wherein a ratio of vehicle speed to engine speed is relatively smaller and a second drive ratio wherein a ratio of vehicle speed to engine speed is relatively larger; wherein, when the drivetrain is in the first drive ratio, the control controls the engine in accordance with a first characteristic engine function characterized by occurrence of peak torque at an engine speed below a rated engine speed at which the torque is less than peak torque, and a speed range that extends beyond rated engine speed to a maximum engine speed at which the engine outputs substantially zero torque; and when the drivetrain is in the second drive ratio, the control controls the engine in accordance with a second characteristic engine function characterized by occurrence of peak torque at an engine speed below the rated engine speed and of substantial maintenance of the peak torque over a range of increasing engine speeds that includes the rated engine speed and extends to a maximum engine speed at which the engine outputs substantially zero torque.

The invention also relates to a method of operating an automotive vehicle comprising an internal combustion engine under the control of an engine control that receives various inputs including a throttle input, that is programmed with data defining different characteristic engine operation functions relating engine torque to engine speed, and that processes the inputs and the programmed data to select a characteristic engine function through which the throttle input acts to operate the engine, a turbocharger powered by engine exhaust gas, an exhaust gas recirculation system controlled by the engine for recirculating exhaust gas through the engine, and a drivetrain which is operable to different drive ratios through which the engine powers the vehicle, such drive ratios including a first drive ratio wherein a ratio of vehicle speed to engine speed is relatively smaller and a high drive ratio wherein a ratio of vehicle speed to engine speed is relatively larger, the method comprising: when the drivetrain is in the first drive ratio and the turbocharger is being powered by exhaust gas, causing the control to inhibit the exhaust gas recirculation system from recirculating exhaust gas through the engine; and when the drivetrain is in the second drive ratio, causing the control to allow the exhaust gas recirculation system to selectively recirculate exhaust gas through the engine.

The foregoing, along with further features and advantages of the invention, will be seen in the following disclosure of a presently preferred embodiment of the invention depicting the best mode contemplated at this time for carrying out the invention. The disclosure includes accompanying drawings, briefly described as follows.

BRIEF DESCRIPTION OF THE DRAWINGS

FIG. 3 also shows isonchronous regulation coincident with rated engine speed.

DESCRIPTION OF THE PREFERRED EMBODIMENT

Figure 1:
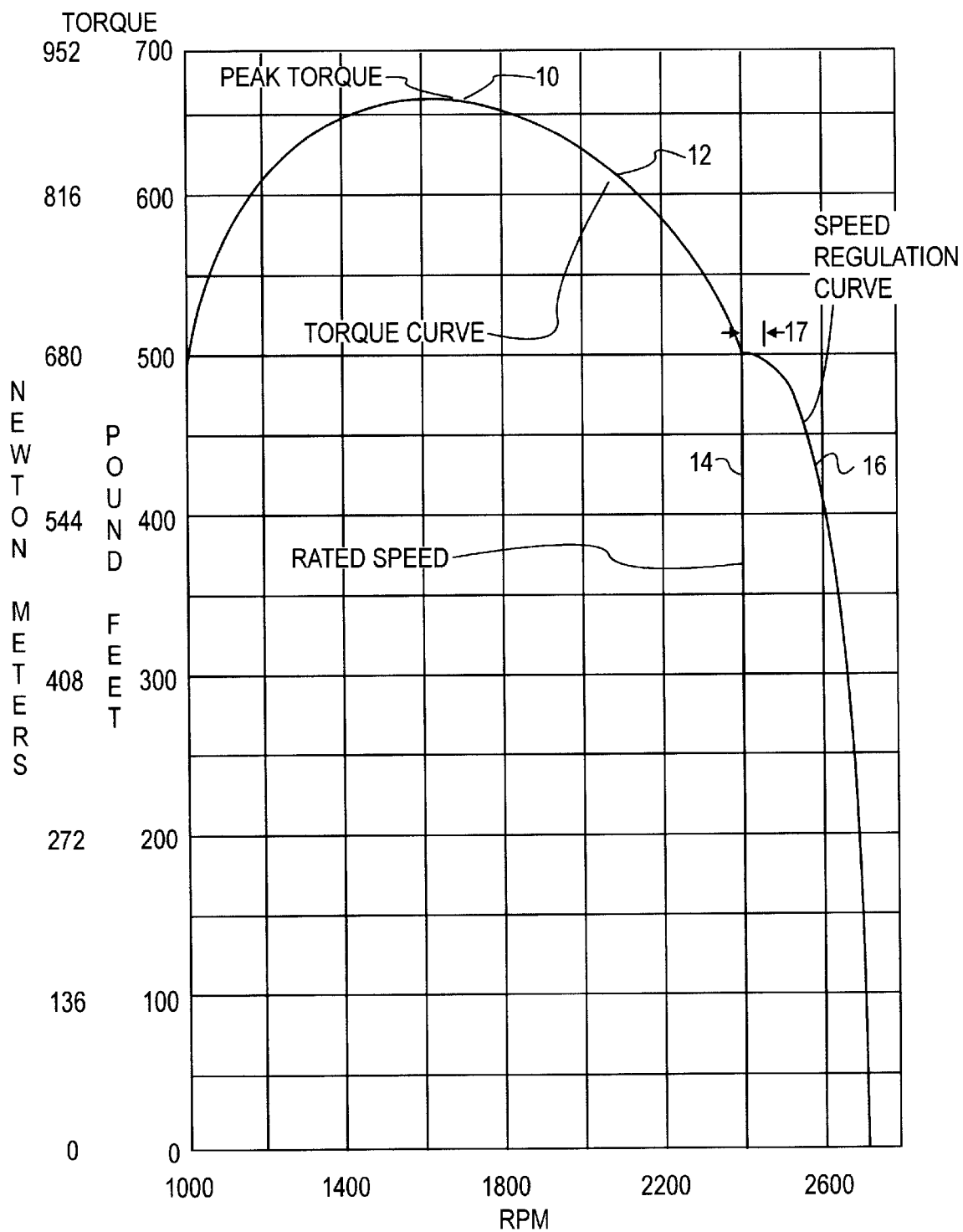
FIG. 1 is a graph plot that illustrates a torque-speed characteristic of a compression ignition internal combustion engine over a range of interest.

In FIG. 1, rated engine speed 14 demarcates two regions of a torque-speed characteristic of a compression ignition internal combustion engine. The region to the left, i.e. below the 2400 rpm (revolutions per minute) engine speed, may be considered a torque curve 12; the region to the right, a speed regulation curve 16. Maximum engine output torque occurs at about slightly more than 1500 rpm, and is marked peak torque 10.

The term "rated speed" has been traditionally understood to mean the speed above which a mechanical governor became effective to manage the fuel injected into the engine's cylinders, and consequently engine performance. Microprocessor control of fuel delivery has largely replaced the use of mechanical governors, and so as applied to a microprocessor-controlled engine, the term "rated speed" denotes a speed that is defined by the engine manufacturer and corresponds to a point below which the control strategy is one of managing engine variables for maximum intended output along what is herein referred to as the torque curve, i.e. torque curve 12, and above which, the strategy becomes that of managing the variables to simulate the function of a mechanical governor, namely limiting power along a speed regulation curve, i.e. speed regulation curve 16.

FIG. 1 shows that at rated speed, the torque-speed characteristic displays an inflection point, rather than a smoothly changing slope. As speed is increasing toward rated speed, the rate at which torque is decreasing as a function of engine speed is progressively increasing. At rated speed, that changes. Over a limited range of engine speeds just above rated engine speed, marked by reference numeral 17 in FIG. 1, the torque remains fairly flat. As speed increases beyond that limited range, the rate at which torque is decreasing once again progressively increases.

Figure 2:
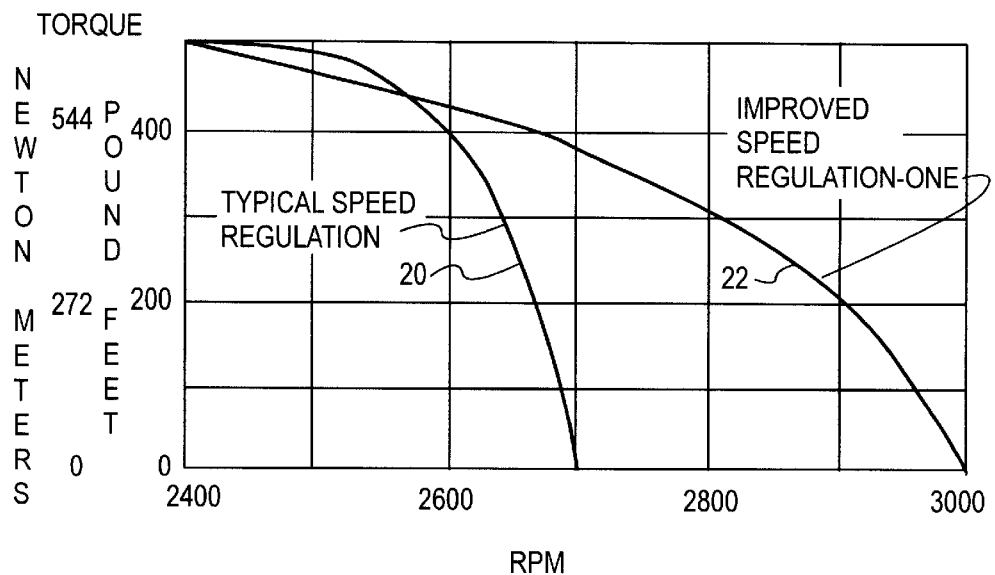
FIG. 2 is a graph plot that illustrates a portion of the torque-speed characteristic of FIG. 1 on a different scale, and also a first improved speed regulation characteristic.

FIG. 2 illustrates two different speed regulation curves, a Typical Speed regulation curve 20 and a first Improved Speed Regulation curve 22, also called Improved Speed Regulation—One.

Curve 20 depicts a characteristic wherein at first, torque is progressively reduced somewhat modestly as engine speed progressively increases from rated engine speed. As speed increases further however, the torque is reduced more rapidly, ultimately reducing to zero at maximum engine speed of about 2700 rpm in this example. Maximum speed is approximately some 10% to 15% greater than rated engine speed.

Curve 22 provides a generally uniform rate of torque reduction as engine speed progressively increases from rated engine speed over a range that extends beyond 2700 rpm. Such a characteristic, when put into practice according to principles of the present invention, is intended to cause a generally uniform rate of decay in vehicle acceleration as engine speed increases. The extended range also serves to extend reduction in the rate of decay of vehicle acceleration.

Figure 3:
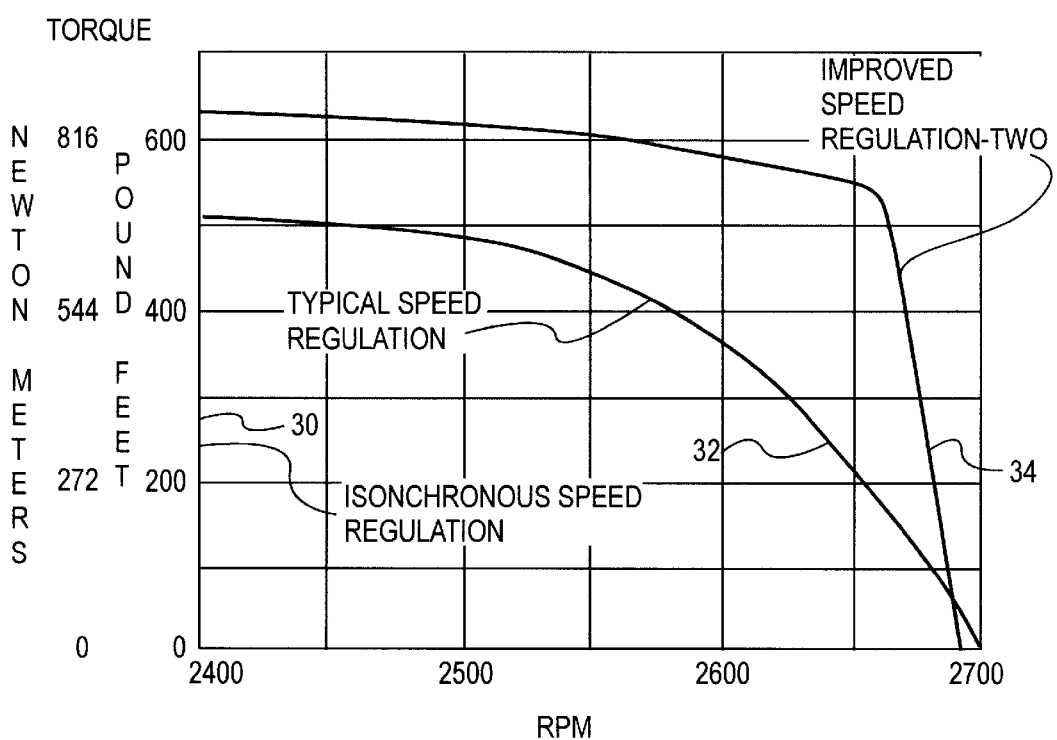
FIG. 3 is a graph plot that illustrates a portion of the torque-speed characteristic of FIG. 1 on a different scale and also a second improved speed regulation characteristic.

FIG. 3 illustrates a portion of a Typical Speed Regulation Curve 32, and a second Improved Speed Regulation curve 34, also called Improved Speed Regulation —Two.

Curve 32 is essentially identical to the corresponding portion of curve 20. Isonchronous speed regulation coincident with rated engine speed is marked for reference, as it is used for one condition of vehicle operation as will be explained with reference to FIG. 6.

Curve 34 is fairly level along an initial portion of a speed range speed extending from rated engine speed. As it begins to decrease, it does so at first rather gradually, but then at some point, approximately 10% above rated speed in this instance, it does so much more abruptly, finally falling to zero torque output at a maximum engine speed close to the maximum speed of curve 32, about 2700 rpm in this example.

Figure 4:
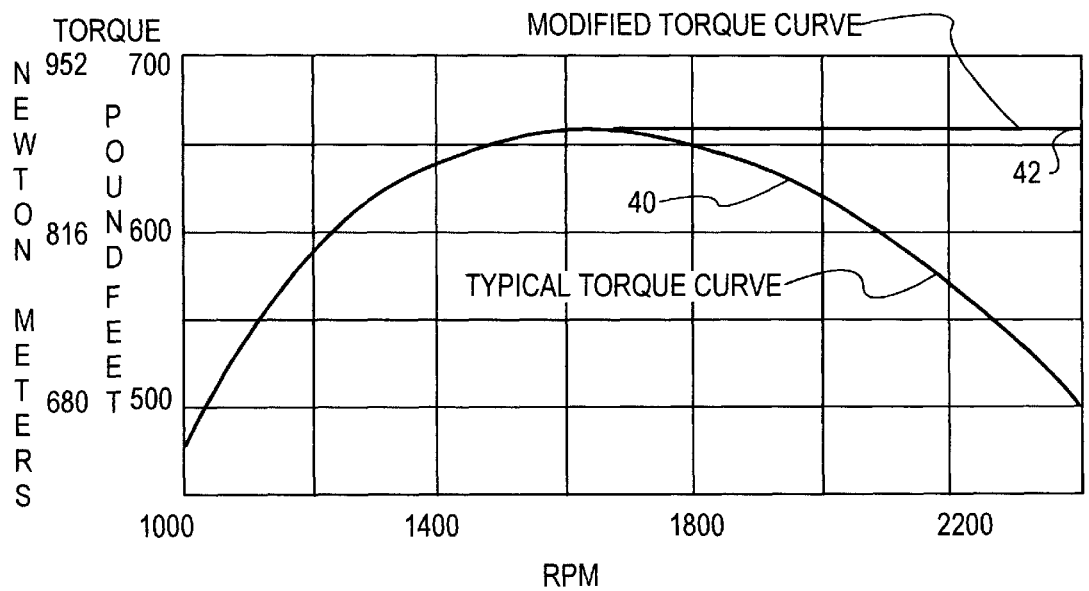
FIG. 4 is a graph plot that illustrates another portion of the torque-speed characteristic of FIG. 1 on a different scale, and also a modified torque curve.

FIG. 4 illustrates a portion of a typical torque curve 40 and a modified torque curve 42. Curve 40 is shown to have a peak close to 1500 rpm in this example. Curve 42 essentially matches curve 40 over a speed range extending below the peak torque speed of curve 40. Unlike curve 40 however, the portion of curve 42 within a speed range extending above the peak torque of curve 40 is fairly flat, i.e. constant or plateaued, up to rated engine speed.

Figure 5:
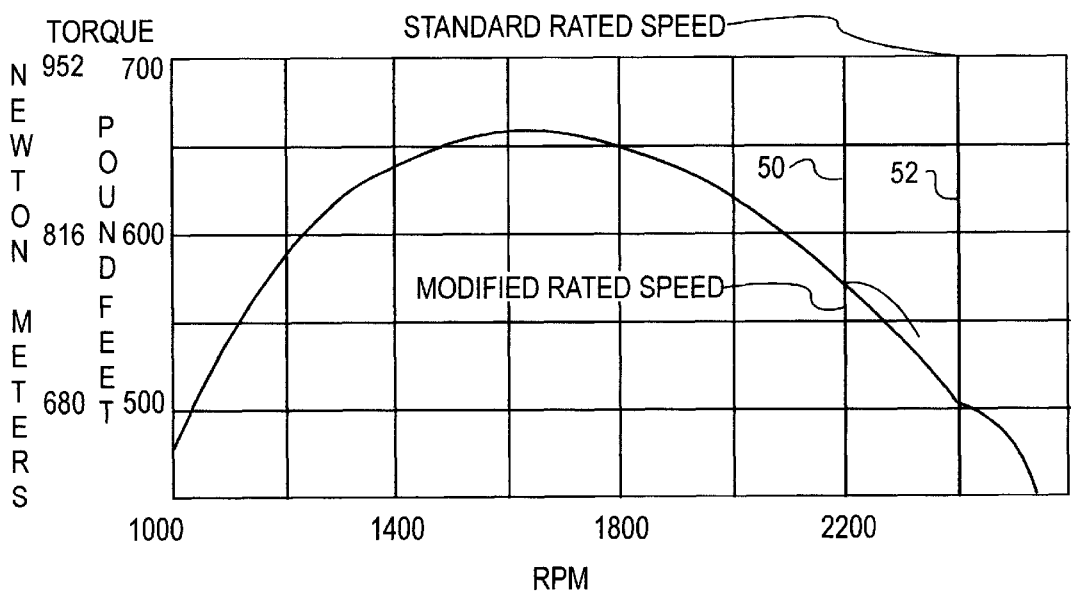
FIG. 5 is a graph plot that illustrates the same portion of the torque-speed characteristic of FIG. 1 as FIG. 4, and also shows a modified rated speed.

FIG. 5 illustrates portions of two torque-speed curves. The first curve, which shows an inflection point at rated engine speed of 2400 rpm, (reference numeral 52) is the curve of FIG. 1. The second curve, which shows an inflection point at 2200 rpm, results from modifying the first curve by reducing the rated speed 200 rpm to a modified rated speed of 2200 rpm (reference numeral 50).

Figure 6:
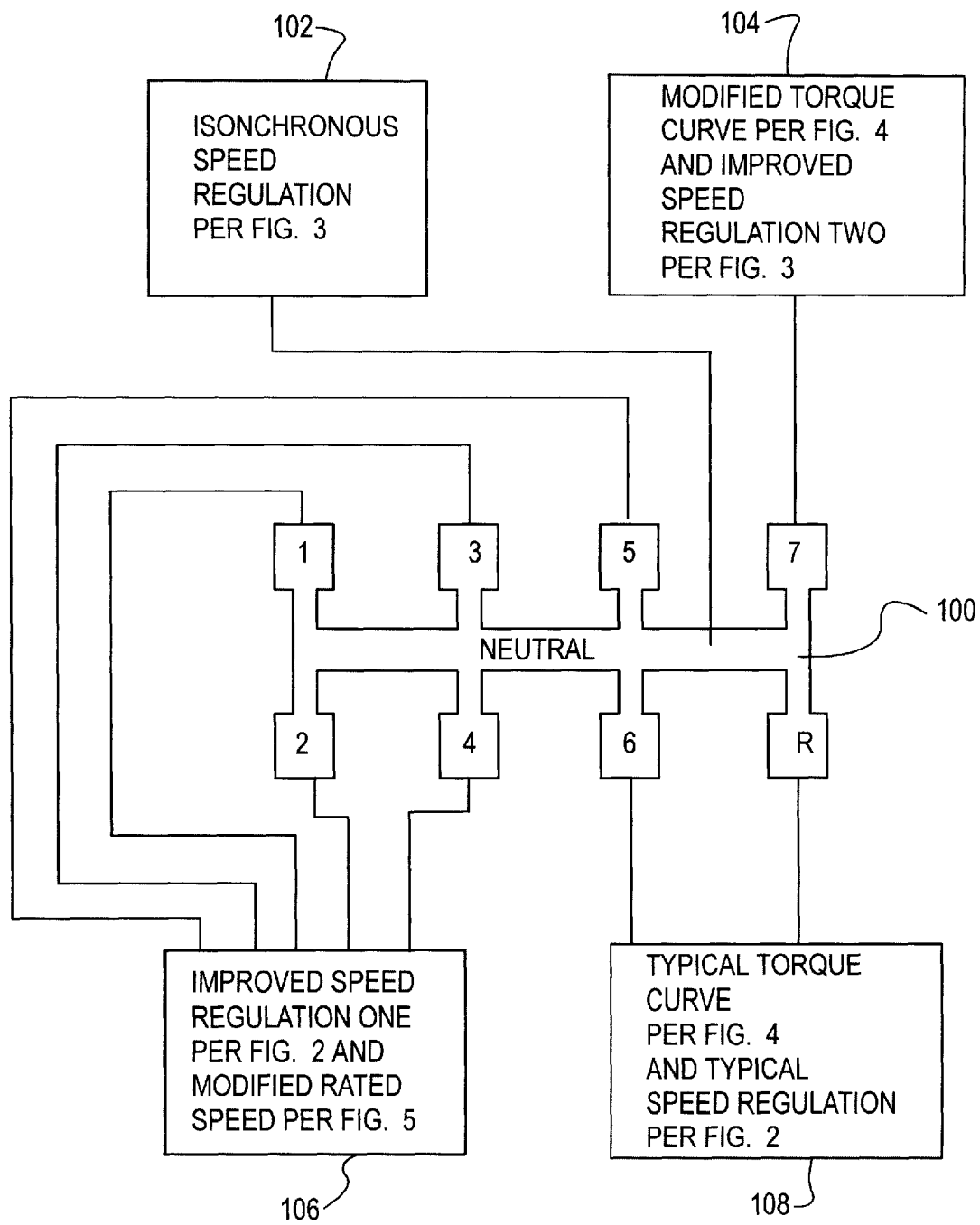
FIG. 6 is a diagrammatic representation of an exemplary implementation of the present invention in a truck.
Figure 7:
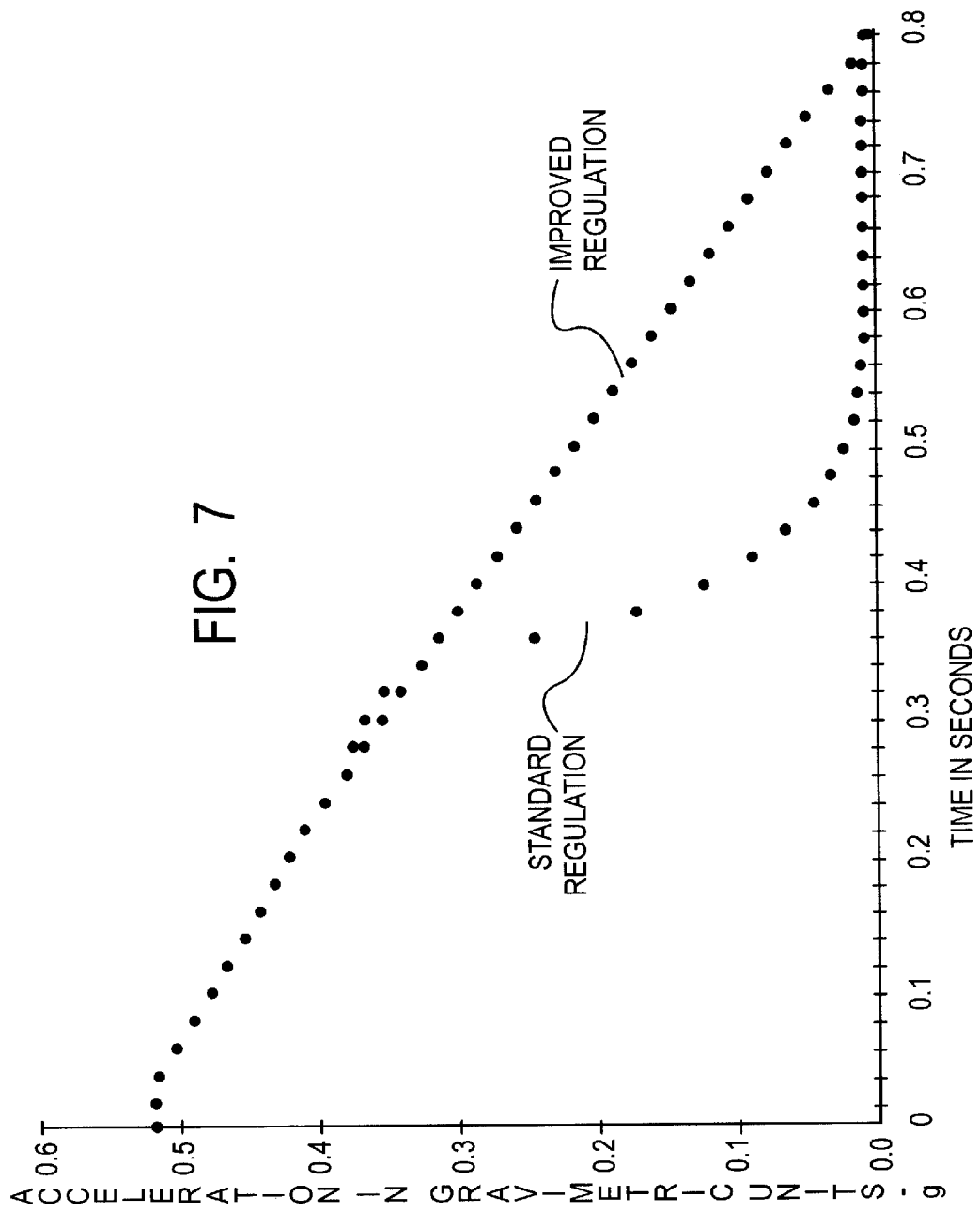
FIG. 7 shows a graph plot of representative low gear acceleration of a vehicle embodying principles of the invention and a graph plot of same gear acceleration of the vehicle without the invention.

FIG. 6 is a diagrammatic representation of a gear shift control 100 and various engine management strategies within a microprocessor-based engine control. These strategies correlate with the curves of the FIGS. noted. The vehicle may have either a manual transmission or an automatic one, and so gear shift control 100 may be either a manual transmission shifter or an automatic transmission shifter. Electric switches and/or other electric sensors associated with gear shift control 100 and/or the vehicle drivetrain are coupled with the engine control by interconnecting wires so that as the vehicle is being accelerated through different drive ratios, an input to the engine control from the vehicle indicates the particular drivetrain drive ratio coupling the engine to driven wheels of the vehicle. Although the FIG. shows that certain specific shift positions will select particular strategies, that specific illustration is only an example of various possibilities for providing drivetrain driveratio input to an engine controller.

A preferred embodiment for the present invention is a medium truck powered by a diesel engine having a turbocharger and controlled by an electronic microprocessor, although the invention is also considered suitable for application to heavy trucks, light trucks, and to other types of engines. The truck of the preferred embodiment has a multi-gear transmission with shift controls and sensors and/or switches like that shown. The microprocessor is programmed with a selection of engine operating strategies.

As a vehicle transmission is shifted through various gears during acceleration, particular engine operating strategies are invoked by particular gear ratios. In the lowest gears, Improved Speed Regulation—One of FIG. 2 is selected to reduce the normally abrupt decay in vehicle acceleration that would otherwise result if Typical Speed Regulation 20 were used. Additionally, the modified rated speed 50 of FIG. 5 is selected to reduce noise and to partially compensate for the higher engine unloaded speed that results from the higher speed regulation of Improved Speed Regulation—One.

In intermediate and reverse gears, typical engine performance characteristics such as Typical Speed Regulation 20 and Typical Torque 40 are selected.

Figure 8:
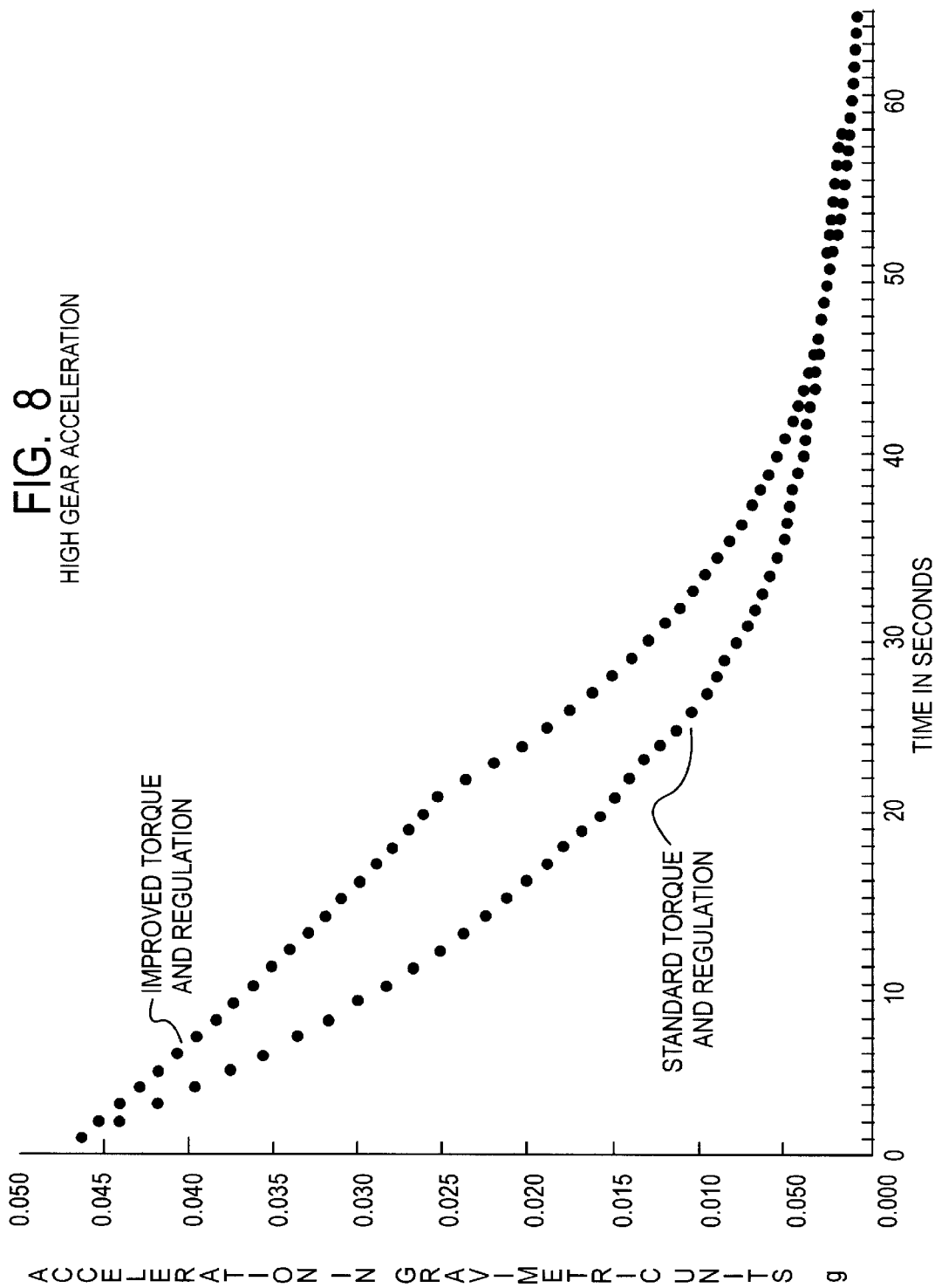
FIG. 8 shows a graph plot of representative high gear acceleration of a vehicle embodying principles of the invention and a graph plot of same gear acceleration of the vehicle without the invention.

In the highest gears, Modified Torque 42 of FIG. 4 is selected, along with the second Improved Speed Regulation 34 of FIG. 3. These two modifications give the vehicle the feeling of sustained pulling power up to the effective road, or highway, speed, as shown in FIG. 8. These two modifications are feasible in the highest gears, but not in the lowest gears. The increased torque at full engine speed generates more heat, and that heat is apt to be effectively dissipated at high road speeds, but not at lower road speeds. The effect of wind drag on the vehicle accommodates the unusual speed regulation by effectively acting as the governor on the engine. Likewise the wind drag at high speed gives the vehicle effective torque rise by virtue of the rapid fall off during vehicle slowdown.

Isonchronous speed regulation 30 of FIG. 3 is selected when the vehicle is in neutral to provide most preferred speed control while operating auxiliary equipment.

FIG. 6 diagramatically shows connection between all gear selections and one or another of the engine control strategies. Some economy of physical installation can be achieved by choosing one or several connections to the same strategy as a default selection in the microprocessor. For example the selections of strategy 108 in FIG. 6 could be the default mode for the microprocessor, thereby eliminating a need for physical electrical connections of the microprocessor to sixth and reverse gears.

There may be variations of the preferred embodiment where an engineering analysis indicates selections of engine strategies different from those described above. For example it may be more advantageous to select strategy 106 of FIG. 6 in only first, second, and third gears and to select strategy 108 in fourth through sixth and reverse gears. Likewise vehicles that have two-speed rear axles will need an input to inform the microprocessor of axle selection which is effectively part of the overall gear ratio selection.

Other embodiments may use intelligence of the vehicle operating mode to participate in the engine operating strategy. For example, the engine may be better operated in low gears without exhaust gas recirculation, but operate with lower emissions in higher gears if the exhaust gas is recirculated to the intake air.

Figure 9:
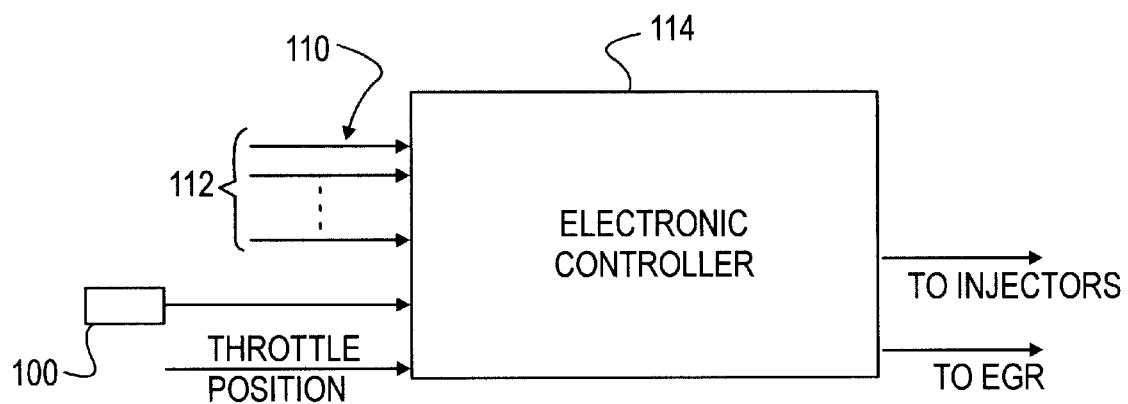
FIG. 9 is a general block diagram of an electronic engine control.

FIG. 9 illustrates a general form of electronic engine control 110 for implementing the present invention in a truck. Values of variables relevant to engine operation are obtained from various sources, and they are collectively designated by the reference numeral 112. Those inputs, together with the transmission gear shift input 100, and the throttle position sensor input, are supplied to an electronic controller 114. Controller 114 contains a microprocessor, including memory, for processing the various inputs according to stored algorithms to develop the proper outputs for controlling fuel injected into the engine cylinders. The various torque-speed characteristics that have been described above to exemplify the inventive principles can be embodied as data stored in memory of controller 114 in correlation with corresponding fuel management commands that will provide proper fuel delivery to cause the engine to operate in accordance with the appropriate torque-speed characteristic at the appropriate time based on input variable values. As input variables change in certain ways, the engine may operate in accordance with a particular one of the torque-speed characteristics until such time as the variables change in ways that call for operation in accordance with a different torque-speed characteristic.

While a presently preferred embodiment of the invention has been illustrated and described, it should be appreciated that principles of the invention are applicable to all embodiments that fall within the scope of the following claims.

What is claimed is:

1. A method of operating an automotive vehicle comprising an internal combustion engine under the control of an engine control that receives various inputs including a throttle input, that is programmed with data defining different characteristic engine operation functions relating engine torque to engine speed, and that processes the inputs and the programmed data to select a characteristic engine function through which the throttle input acts to operate the engine, the vehicle also comprising a drivetrain that is operable to different drive ratios through which the engine powers the vehicle, such drive ratios including a low drive ratio wherein a ratio of vehicle speed to engine speed is low, a high drive ratio wherein a ratio of vehicle speed to engine speed is high, and an intermediate drive ratio wherein the ratio of vehicle speed to engine speed is intermediate that of the low drive ratio and that of the high drive ratio, the method comprising:

when the drivetrain is in the intermediate drive ratio, controlling the engine by causing the control to select a first characteristic engine function characterized by occurrence of peak torque at an engine speed below a rated engine speed at which the torque is less than peak torque, and a speed range that extends beyond rated engine speed to a maximum engine speed of the first characteristic engine function at which the engine outputs substantially zero torque;

when the drivetrain is in the low drive ratio, controlling the engine by causing the control to select a second characteristic engine function characterized by occurrence of peak torque at an engine speed below the rated engine speed, and a speed range that extends to a maximum engine speed of the second characteristic engine function at which the engine outputs substantially zero torque and which is greater than the maximum engine speed of the first characteristic engine function;

and when the drivetrain is in the high drive ratio, controlling the engine by selecting a third characteristic engine function characterized by occurrence of peak torque at an engine speed below the rated engine speed and of substantial maintenance of the peak torque over a range of increasing engine speeds that includes the rated engine speed and extends to a maximum engine speed of the third characteristic engine function at which the engine outputs substantially zero torque.

2. A method as set forth in claim 1 including the step of modifying the second characteristic engine function by reducing the rated engine speed to a modified rated engine speed, when the drivetrain is in the low drive ratio.

3. A method as set forth in claim 1 including the step of causing the engine to be controlled by isochronous speed regulation when the drivetrain is in neutral not powering the vehicle.

4. A method as set forth in claim 1 in which the drivetrain is operable to plural different low drive ratios and to plural different high drive ratios;

when the drivetrain is in any of the plural low drive ratios, the engine is controlled by causing the control to select a respective second characteristic engine function characterized by occurrence of peak torque at an engine speed below the rated engine speed, and a speed range that extends to a maximum engine speed of the respective second characteristic engine function at which the engine outputs substantially zero torque and which is greater than the maximum engine speed of the first characteristic engine function;

and when the drivetrain is in any of the high drive ratios, the engine is controlled by selecting a respective third characteristic engine function characterized by occurrence of peak torque at an engine speed below the rated engine speed and of substantial maintenance of the peak torque over a range of increasing engine speeds that includes the rated engine speed and extends to a maximum engine speed of the respective third characteristic engine function at which the engine outputs substantially zero torque.

5. An automotive vehicle comprising:

an internal combustion engine under the control of an engine control that receives various inputs including a throttle input, that is programmed with data defining different characteristic engine operation functions relating engine torque to engine speed, and that processes the inputs and the programmed data to select a characteristic engine function through which the throttle input acts to operate the engine;

a drivetrain that is operable to different drive ratios through which the engine powers the vehicle, such drive ratios including a low drive ratio wherein a ratio of vehicle speed to engine speed is low, a high drive ratio wherein a ratio of vehicle speed to engine speed is high, and an intermediate drive ratio wherein the ratio of vehicle speed to engine speed is intermediate that of the low drive ratio and that of the high drive ratio; wherein, when the drivetrain is in the intermediate drive ratio, the control controls the engine in accordance with a first characteristic engine function characterized by occurrence of peak torque at an engine speed below a rated engine speed at which the torque is less than peak torque, and a speed range that extends beyond rated engine speed to a maximum engine speed of the first characteristic engine function at which the engine outputs substantially zero torque;

when the drivetrain is in the low drive ratio, the control controls the engine in accordance with a second characteristic engine function characterized by occurrence of peak torque at an engine speed below the rated engine speed, and a speed range that extends to a maximum engine speed of the second characteristic engine function at which the engine outputs substantially zero torque and which is greater than the maximum engine speed of the first characteristic engine function;

and when the drivetrain is in the high drive ratio, the control controls the engine in accordance with a third characteristic engine function characterized by occurrence of peak torque at an engine speed below the rated engine speed and of substantial maintenance of the peak torque over a range of increasing engine speeds that includes the rated engine speed and extends to a maximum engine speed of the third characteristic engine function at which the engine outputs substantially zero torque.

6. An automotive vehicle as set forth in claim 5 in which the control modifies the second characteristic engine function by reducing the rated engine speed o a modified rated engine speed when the drivetrain is in the low drive ratio.

7. An automotive vehicle as set forth in claim 5 in which the control causes isonchronous speed regulation of the engine when the drivetrain is in neutral not powering vehicle.

8. An automotive vehicle as set forth in claim 5 in which the drivetrain is operable to plural different low drive ratios and to plural different high drive ratios;

when the drivetrain is in any of the plural low drive ratios, the control controls the engine in accordance with a respective second characteristic engine function characterized by occurrence of peak torque at an engine speed below the rated engine speed, and a speed range that extends to a maximum engine speed of the respective second characteristic engine function at which the engine outputs substantially zero torque and which is greater than the maximum engine speed of the first characteristic engine function;

and when the drivetrain is in any of the high drive ratios, the control controls the engine in accordance a third characteristic engine function characterized by occurrence of peak torque at an engine speed below the rated engine speed and of substantial maintenance of the peak torque over a range of increasing engine speeds that includes the rated engine speed and extends to a maximum engine speed of the respective third characteristic engine function at which the engine outputs substantially zero torque.

9. A method of operating an automotive vehicle comprising an internal combustion engine under the control of an engine control that receives various inputs including a throttle input, that is programmed with data defining different characteristic engine operation functions relating engine torque to engine speed, and that processes the inputs and the programmed data to select a characteristic engine function through which the throttle input acts to operate the engine, the vehicle also comprising a drivetrain that is operable to different drive ratios through which the engine powers the vehicle, such drive ratios including a first drive ratio having a given ratio of vehicle speed to engine speed and a second drive ratio wherein a ratio of vehicle speed to engine speed is larger than the given ratio of the first drive ratio, the method comprising:

when the drivetrain is in the second drive ratio, controlling the engine by causing the control to select a first characteristic engine function characterized by occurrence of peak torque at an engine speed below a rated engine speed at which the torque is less than peak torque, and a speed range that extends beyond rated engine speed to a maximum engine speed of the first characteristic engine function at which the engine outputs substantially zero torque; and when the drivetrain is in the first drive ratio, controlling the engine by causing the control to select a second characteristic engine function characterized by occurrence of peak torque at an engine speed below the rated engine speed, and a speed range that extends to a maximum engine speed of the second characteristic engine function at which the engine outputs substantially zero torque and which is greater than the maximum engine speed of the first characteristic engine function.

10. A method as set forth in claim 9 including the step of modifying the second characteristic engine function by reducing the rated engine speed to a modified rated engine speed, when the drivetrain is in the first drive ratio.

11. A method of operating an automotive vehicle comprising an internal combustion engine under the control of an engine control that receives various inputs including a throttle input, that is programmed with data defining different characteristic engine operation functions relating engine torque to engine speed, and that processes the inputs and the programmed data to select a characteristic engine function through which the throttle input acts to operate the engine, the vehicle also comprising a drivetrain that is operable to different drive ratios through which the engine powers the vehicle, such drive ratios including a first drive ratio having a given ratio of vehicle speed to engine speed and a second drive ratio wherein a ratio of vehicle speed to engine speed is larger than the given ratio of the first drive ratio, the method comprising:

when the drivetrain is in the first drive ratio, controlling the engine by causing the control to select a first characteristic engine function characterized by occurrence of peak torque at an engine speed below a rated engine speed at which the torque is less than peak torque, and a speed range that extends beyond rated engine speed to a maximum engine speed of the first characteristic engine function at which the engine outputs substantially zero torque; and when the drivetrain is in the second drive ratio, controlling the engine by selecting a second characteristic engine function characterized by occurrence of peak torque at an engine speed below the rated engine speed and of substantial maintenance of the peak torque over a range of increasing engine speeds that includes the rated engine speed and extends to a maximum engine speed of the second characteristic engine function at which the engine outputs substantially zero torque.

12. An automotive vehicle comprising:

an internal combustion engine under the control of an engine control that receives various inputs including a throttle input, that is programmed with data defining different characteristic engine operation functions relating engine torque to engine speed, and that processes the inputs and the programmed data to select a characteristic engine function through which the throttle input acts to operate the engine;

a drivetrain that is operable to different drive ratios through which the engine powers the vehicle, such drive ratios including a first drive ratio having a given ratio of vehicle speed to engine speed and a second drive ratio wherein a ratio of vehicle speed to engine speed is larger than the given ratio of the first drive ratio; wherein, when the drivetrain is in the second drive ratio, the control controls the engine in accordance with a first characteristic engine function characterized by occurrence of peak torque at an engine speed below a rated engine speed at which the torque is less than peak torque, and a speed range that extends beyond rated engine speed to a maximum engine speed of the first characteristic engine function at which the engine outputs substantially zero torque; and when the drivetrain is in the first drive ratio, the control controls the engine in accordance with a second characteristic engine function characterized by occurrence of peak torque at an engine speed below the rated engine speed, and a speed range that extends to a maximum engine speed of the second characteristic engine function at which the engine outputs substantially zero torque and which is greater than the maximum engine speed of the first characteristic engine function.

13. An automotive vehicle as set forth in claim 12 in which the control modifies the second characteristic engine function by reducing the rated engine speed to a modified rated engine speed when the drivetrain is in the first drive ratio.

14. An automotive vehicle comprising:

an internal combustion engine under the control of an engine control that receives various inputs including a throttle input, that is programmed with data defining different characteristic engine operation functions relating engine torque to engine speed, and that processes the inputs and the programmed data to select a characteristic engine function through which the throttle input acts to operate the engine;

a drivetrain that is operable to different drive ratios through which the engine powers the vehicle, such drive ratios including a first drive ratio having a given ratio of vehicle speed to engine speed is and a second drive ratio wherein a ratio of vehicle speed to engine speed is larger than the given ratio of the first drive ratio; wherein, when the drivetrain is in the first drive ratio, the control controls the engine in accordance with a first characteristic engine function characterized by occurrence of peak torque at an engine speed below a rated engine speed at which the torque is less than peak torque, and a speed range that extends beyond rated engine speed to a maximum engine speed of the first characteristic engine function at which the engine outputs substantially zero torque; and when the drivetrain is in the second drive ratio, the control controls the engine in accordance with a second characteristic engine function characterized by occurrence of peak torque at an engine speed below the rated engine speed and of substantial maintenance of the peak torque over a range of increasing engine speeds that includes the rated engine speed and extends to a maximum engine speed of the second characteristic engine function at which the engine outputs substantially zero torque.

15. A method of operating an automotive vehicle comprising an internal combustion engine under the control of an engine control that receives various inputs including a throttle input, that is programmed with data defining different characteristic engine operation functions relating engine torque to engine speed, and that processes the inputs and the programmed data to select a characteristic engine function through which the throttle input acts to operate the engine, a turbocharger powered by engine exhaust gas, an exhaust gas recirculation system controlled by the engine for recirculating exhaust gas through the engine, and a drivetrain which is operable to different drive ratios through which the engine powers the vehicle, such drive ratios including a first drive ratio having a given ratio of vehicle speed to engine speed and a second drive ratio wherein a ratio of vehicle speed to engine speed is larger than the given ratio of the first drive ratio, the method comprising:

when the drivetrain is in the first drive ratio and the turbocharger is being powered by exhaust gas, using a signal indicative of the drivetrain being in the first drive ratio to cause the control to inhibit the exhaust gas recirculation system from recirculating exhaust gas through the engine; and when the drivetrain is in the second drive ratio, causing the control to allow the exhaust gas recirculation system to selectively recirculate exhaust gas through the engine.

* * * * *